March 22, 1955 S. H. NORTON 2,704,422
MACHINE FOR THINNING THE LANDS OF OIL PISTON RINGS
Filed July 25, 1952 10 Sheets-Sheet 1

Inventor
Samuel H. Norton

March 22, 1955 S. H. NORTON 2,704,422
MACHINE FOR THINNING THE LANDS OF OIL PISTON RINGS
Filed July 25, 1952 10 Sheets-Sheet 2

Fig. 4

Inventor
Samuel H. Norton

March 22, 1955 S. H. NORTON 2,704,422
MACHINE FOR THINNING THE LANDS OF OIL PISTON RINGS
Filed July 25, 1952 10 Sheets-Sheet 4

Inventor
Samuel H. Norton
by Hill, Sherman, Meroni, Gross & Simpson Attys March 22, 1955 S. H. NORTON 2,704,422
MACHINE FOR THINNING THE LANDS OF OIL-PISTON RINGS
Filed July 25, 1952 10 Sheets-Sheet 5

Inventor
Samuel H. Norton

March 22, 1955  S. H. NORTON  2,704,422
MACHINE FOR THINNING THE LANDS OF OIL PISTON RINGS
Filed July 25, 1952  10 Sheets-Sheet 6

Inventor
Samuel H. Norton

United States Patent Office 2,704,422
Patented Mar. 22, 1955

2,704,422

MACHINE FOR THINNING THE LANDS OF OIL PISTON RINGS

Samuel H. Norton, University Heights, Ohio, assignor to Thompson Products, Inc., Cleveland, Ohio, a corporation of Ohio Application July 25, 1952, Serial No. 300,808

21 Claims. (Cl. 51—74)

This invention relates to an improved method and apparatus for thinning the lands of oil piston rings.

A principal object of my invention is to provide a simple and improved method and apparatus for thinning the lands of continuous strip piston ring material in a continuous operation.

Another object of my invention is to provide an improved method for thinning the lands of oil piston rings by continuously beveling the inside walls of the crowns of the continuous strip oil piston ring material during the finish grinding operation thereof.

A still further object of my invention is to provide an apparatus for thinning the lands of oil piston ring material by continuously beveling the insides of both crowns of the material during feeding of the stock material in a spiral or helical path, which apparatus employs a thin grinding disk rotatable about an axis inclined with respect to the axis of the helix of the piston ring material.

A still further object of my invention is to provide a simple and efficient apparatus for simultaneously thinning the lands of the facing crowns of flexible oil piston ring strip material by the use of a rotating grinding wheel, fitting within the space between the crowns of the strip material and inclined with respect to the crowns.

A further object of my invention is to provide a new and improved form of apparatus for continuously thinning the lands of flexible strip piston ring material utilizing a plurality of thin disks rotatable about an axis inclined with respect to the faces of the crowns of the strip material and extending in the space between the crowns at an angle with respect thereto.

A further object of my invention is to provide a simple and improved form of apparatus for simultaneously thinning the insides of the crowns of flexible strip piston ring stock, utilizing a thin grinding wheel extending in the space between the crowns and inclined with respect thereto to simultaneously bevel the insides of adjacent crowns at opposite angles, and controlling the thinning operation by a gauge wheel having a face conforming to the bevel of the finished crowns and riding thereon.

A still further object of my invention is to provide a novel and improved form of apparatus for thinning the lands of U-shaped strip piston ring material by providing a rotatable arbor and means for feeding the piston ring material along the arbor in a helical path, and providing a plurality of thin abrasive wheels movable within the spaces between the crowns of adjacent turns of the strip material and inclined at an angle with respect thereto, to bevel the inside walls of the legs of the piston ring material in a single continuous operation.

Still another object of my invention is to provide a novel apparatus for finishing oil piston ring material and thinning the lands thereof, including a rotating arbor, means helically feeding the piston ring material along the arbor, means for grinding the helically fed material to cylinder bore size on one side of the arbor and other means for beveling the insides of the crowns of the helically fed material on the opposite side of the arbor.

Another and more detailed object of my invention is to provide a novel and improved beveling means for beveling the insides of the crowns of piston ring strip material by an abrasive wheel inclined at an angle to the axis of the material, including improved means for feeding the abrasive wheel to the strip material and automatic control means therefor having a gauge wheel riding between the beveled crowns of the strip and conforming to the form thereof, and varying the feed of the abrasive wheel in accordance with the wear on the abrasive wheel and variations in the bevel of the strip above and below a predetermined required bevel.

These and other objects of my invention will appear from time to time as the following specification proceeds, and with reference to the accompanying drawings, wherein.

The piston ring finished and thinned in accordance with the process and apparatus of my invention may be any well known form of oil ring having two vertically spaced cylinder contacting edges or lands, and is herein shown as being a ring known to the trade as the "Bowers ring," such as is disclosed in U. S. Patent No. 2,345,176. This ring may be formed from a tool steel which may be hardened and tempered, such as S. A. E. 1095, containing 0.95% of carbon, and includes generally two axially spaced apart rows of crown segments 10, 10 connected together by a web of a ladder-like form having spaced cross bars 11, 11 connecting said crown segments. Said ring may be produced in accordance with the process disclosed in my copending application Serial No. 111,312, filed August 19, 1949.

Figure 3:
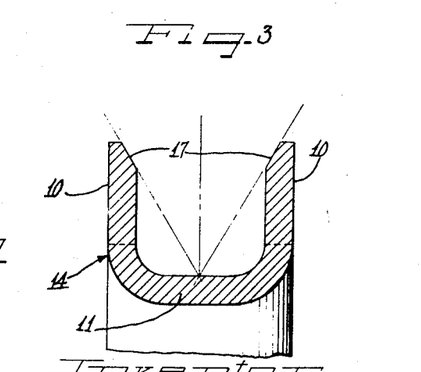
Figure 3 is a sectional view taken through the thinned piston ring.

My present invention relates to an additional step in the process whereby the cylinder contacting edge of the oil ring is thinned to enable the ring to wear in fast and become seated to the surface of the cylinder wall in the shortest possible time, and also to provide a ring which will better distribute the oil on the cylinder wall. In attaining this, I thin the cylinder contacting edge of the oil ring by chamfering or beveling the two inner edges of the crowns of the piston ring material to form a ring having a cross section similar to that illustrated in Figure 3.

Figure 1:
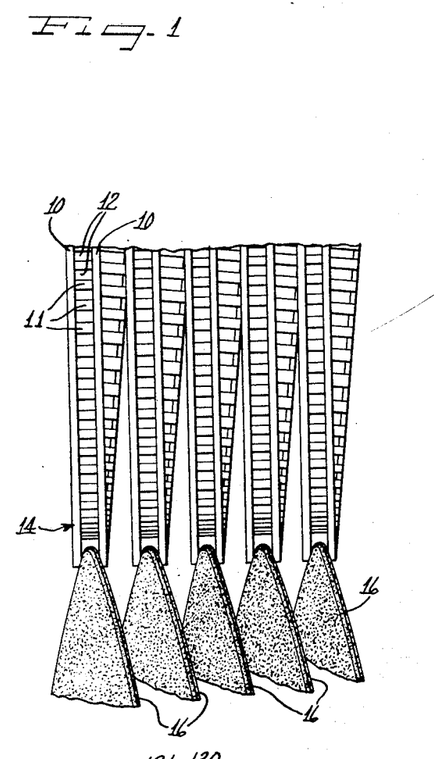
Figure 1 is a diagrammatic view in plan, illustrating the method of beveling the insides of the crowns of the piston ring strip material.
Figure 2:
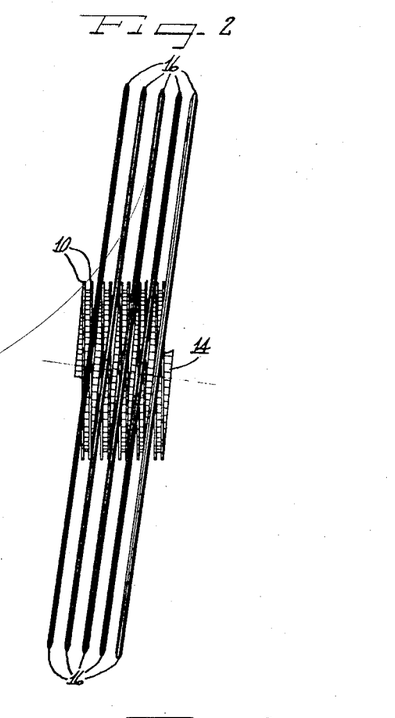
Figure 2 is a diagrammatic view in side elevation, looking toward the abrasive disks and ring from the rear end thereof.

In Figures 1 and 2 I have diagrammatically shown one form in which the insides of the crowns of the rings may be thinned to reduce the width of the lands thereof. As diagrammatically shown in Figure 1, a plurality of spaced thin grinding wheels 16, 16, thin enough to extend in the space between the crowns of the ring, are shown as being spaced in accordance with the spacing between the coils of the helical strip piston ring material 14, and as rotating about an axis inclined at an angle with respect to the faces of the lands of the ring or the axis of the spiral. One edge of each wheel 16 therefore chamfers one leg or crown of the ring and the other edge of the wheel chamfers the other leg of the ring to form the bevels 17, 17 thereon. The wheel or wheels 16, 16 may be rubber wheels having an abrasive embedded or impregnated therein, and which are self-dressing and may be used until the required bevel or V is worn on the periphery of the wheel. It is, of course, obvious that if desired the wheels may be dressed on the periphery thereof to a generally V-shaped form. Any desired number of wheels can be used, provided they are properly spaced to register with the spaces between the crown segments of the ring and to extend within these spaces.

The angle of the bend on the ring may also be varied by varying the angular relation of the wheels with respect to the faces of the lands.

It should here be understood that during the beveling operation of the crowns of the ring, the ring is fed in a helical path and that in its broadest aspects the process of thinning the rings consists generally in grinding the bevel on the insides of the crowns of the ring with a thin grinding wheel rotatable about an axis extending at an angle to the face of the ring, so one side of the wheel will chamfer one crown or leg of the ring and the other edge of the wheel will chamfer the other crown or leg of the ring.

Figure 4:
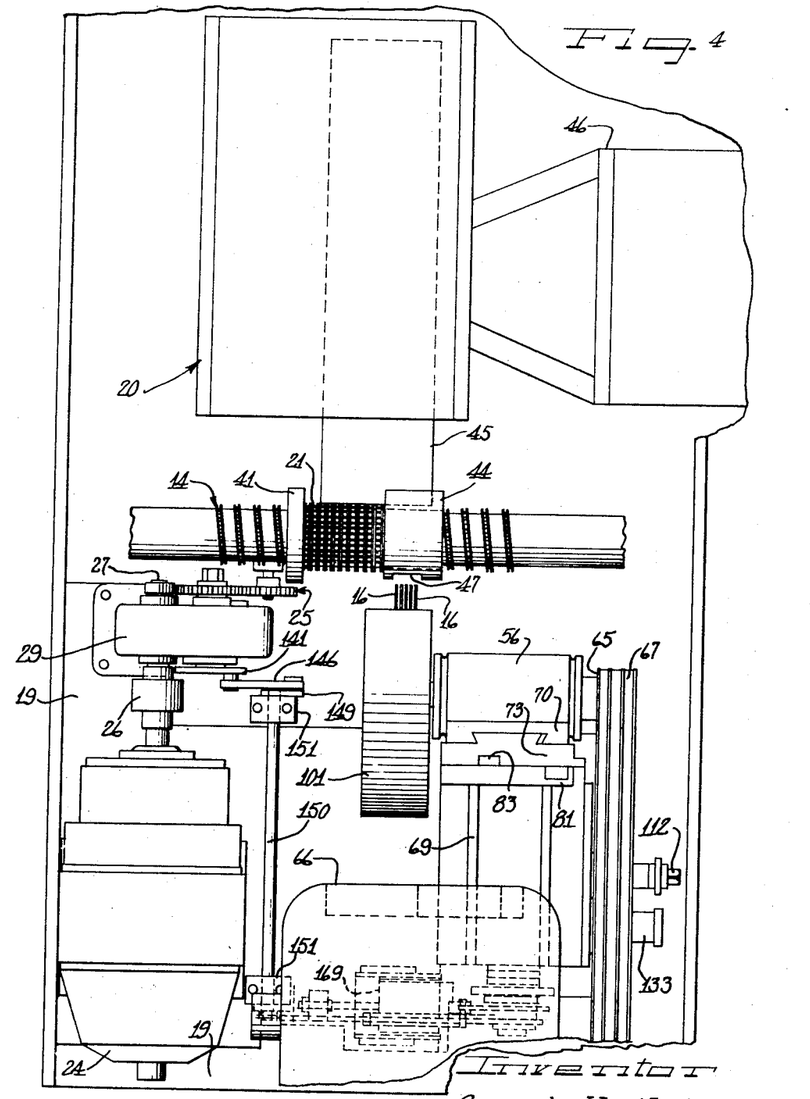
Figure 4 is a plan view of an apparatus for carrying out the finish grinding and thinning operation of my invention.
Figure 5:
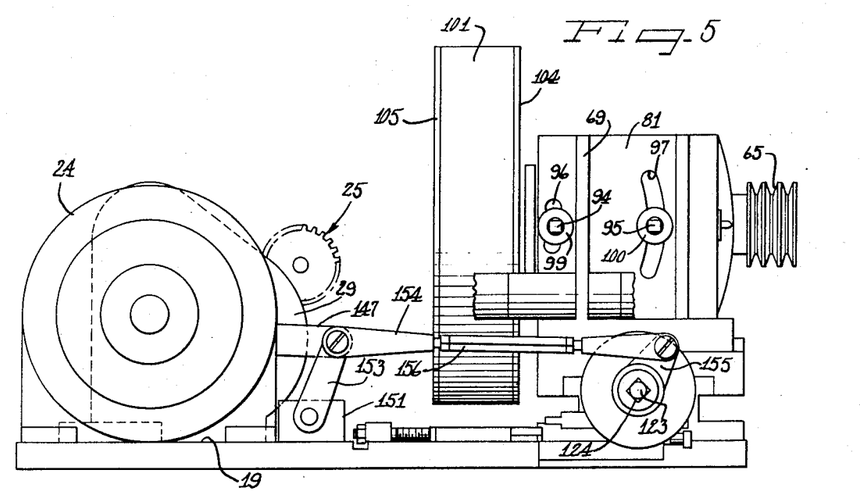
Figure 5 is an end view of the machine shown in Fig. 4.
Figure 6:
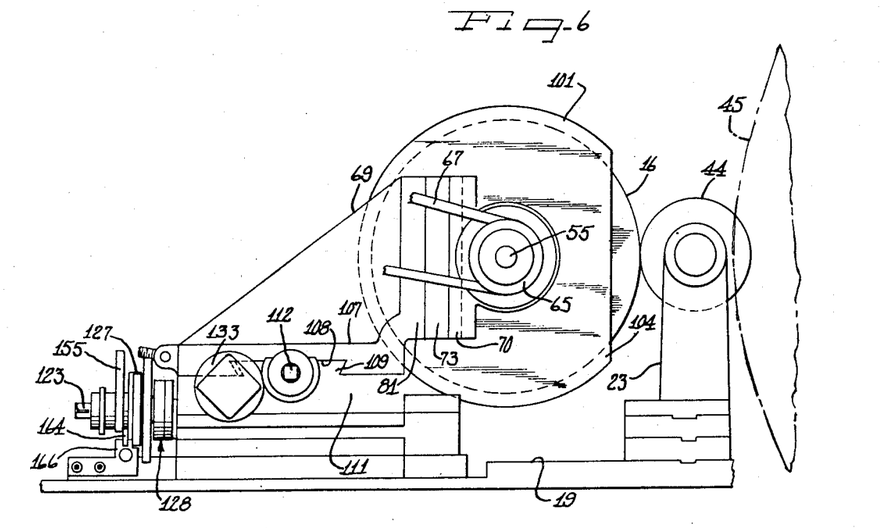
Figure 6 is a fragmentary view in side elevation of the machine shown in Figure 4 and showing in particular the beveling spindle and drive therefor, and the relation between the grinding wheel and the arbor for the piston ring strip material.

In Figure 4 of the drawings I have shown one form of apparatus which may carry out the operation of thinning the lands or edges of the crowns of the piston ring material. This apparatus consists generally in a base plate or table 19 which may be the base of a centerless grinder 20 which is provided to grind the outside of the ring to cylinder bore diameter, as in my aforementioned application Serial No. 111,312. The centerless grinder is shown as having a work arbor 21, rotatably supported at one of its ends in a bearing support 22 and at its opposite end in a spaced bearing support 23 (see Figures 7 and 8). The arbor 21 is shown as being rotatably driven from a motor 24 mounted on the table 19 of the grinder 20.

The drive from the motor 24 to the arbor 21 includes spur reduction gearing 25 driven from the motor 24 through a coupling 26 on the motor shaft and connected with an aligned shaft 27. The shaft 27 is journaled in a housing or casing 29 for the gearing for driving the infeed mechanism for the grinding wheels 16, 16, which will hereinafter be more clearly described as this specification proceeds. The spur reduction gearing 25 drives a worm 30 on a shaft 31 extending transversely of the arbor 21. The worm 30 meshes with a worm gear 33 on a shaft 34 for the arbor 21, for driving said shaft and arbor.

The left-hand end of the mandrel 21 is shouldered as indicated by reference character 37 and has a spur gear 39 mounted thereon. The pitch circle of the spur gear 39 is substantially equal to the outside diameter of the mandrel 21. The teeth of said spur gear are adapted to engage and mesh with slots 12, 12 of the strip piston ring material and progress the material along internal threads 40 of a nut 41 encircling said gear and mandrel, as in my prior application Serial No. 111,312. A key 43 extends along the mandrel or arbor 21 in alignment with one of the teeth of the gear 39, to engage certain of the slots 12 of the piston ring material and hold the piston ring material in tight engagement with the arbor and rotatably drive the piston ring material as it is progressed along said arbor by the threads of the nut 41.

As in my prior application, the arbor 21 has an outside diameter equal to the inside diameter of the finished ring and the number of teeth on the gear 39 is determined by the number of teeth required to mesh with the slots 12 in the web of the piston ring material and stretch the coiled strip material, so that it will tightly cling to said arbor and counteract the tendency of the grinding wheel to pull the strip material off the arbor.

The coils of the helical piston ring material are tight together as the material is progressed along the arbor, and have equal thicknesses for the entire length of said arbor 21, and are picked up by a nut 44 at the right-hand end of said arbor. The nut 44 carries the coils along the arbor 21 at the correct spacing to match the spacing of the grinding wheels 16, 16. The nut 44 is cut away on its opposite sides to accommodate the grinding wheels 16, 16 on the front of the arbor and a wide centerless grinding wheel 45 which grinds the piston ring material to cylinder bore size on the back of the arbor 21.

The grinding wheel 45 is supported on the table 19 and driven from a motor 46 in a manner well known to those skilled in the art, so not herein shown or described further.

Figures 7, 8:
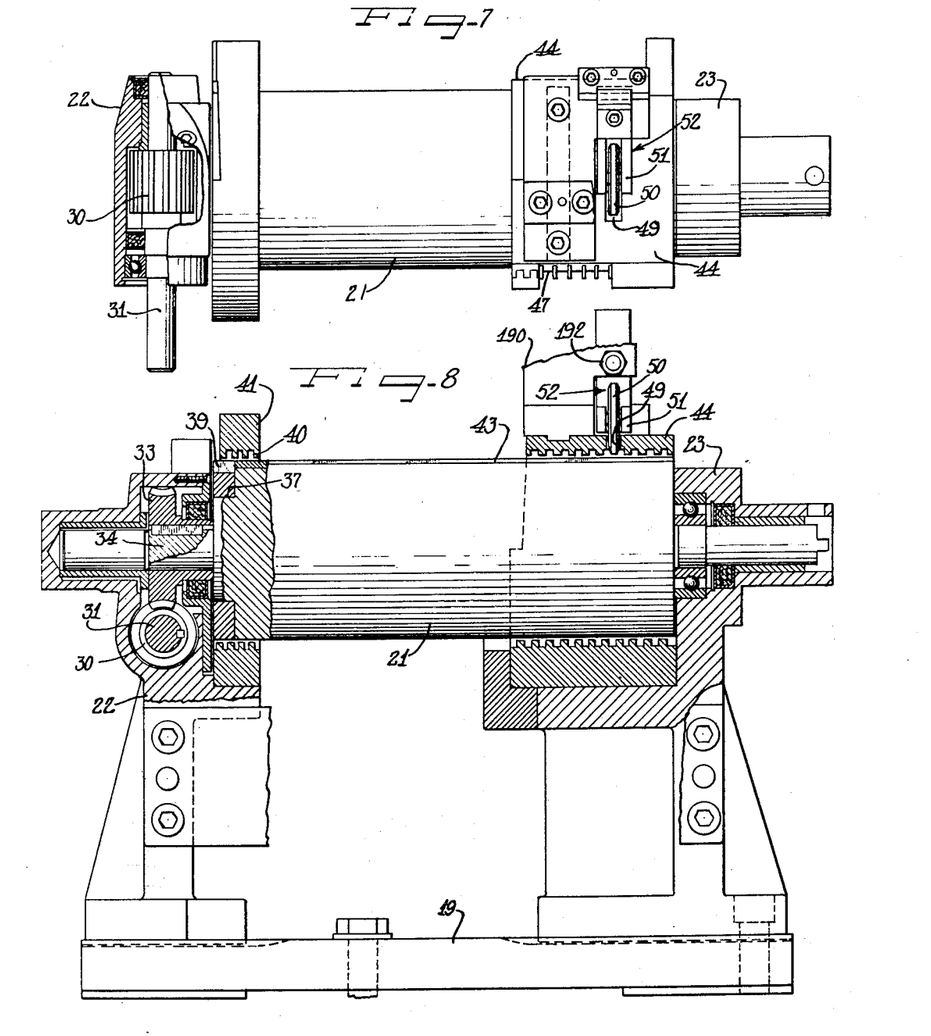
Figure 7 is a plan view of the grinding arbor.
Figure 8 is a fragmentary longitudinal sectional view taken through the support for the grinding arbor and the feed nuts therefor.
Figure 9:
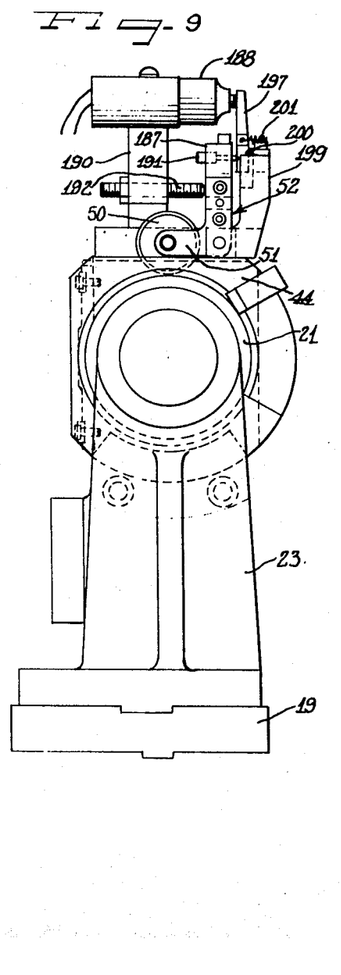
Figure 9 is an end view of the grinding arbor and illustrating the gauging device for gauging the bevel of the crowns of the strip piston ring material.

The cut-away portion of the nut 44 at the front of the arbor is indicated by reference character 47 and is diametrically opposite the rear cut-away portion thereof as shown in Figures 1 and 7, to receive and clear the thin grinding wheels 16, 16 tipped at an angle during the grinding operation. The nut 44 likewise has a cut-away portion 49 in the top thereof through which extends a gauge wheel 50, tapered at its edges to conform to the desired bevel of the crown segments of the ring, and in alignment with the space between the crowns of the ring and rolling on the ground finished beveled edges of the chamfered ring. The gauge wheel 50 is shown in Figure 9 as being pivotally mounted on one arm 51 of a bell crank 52, so as to raise and lower in accordance with the chamfer of the piston ring material and control the infeed of the grinding wheels 16, 16, as will hereinafter more clearly appear as this specification proceeds.

Figures 12, 13:
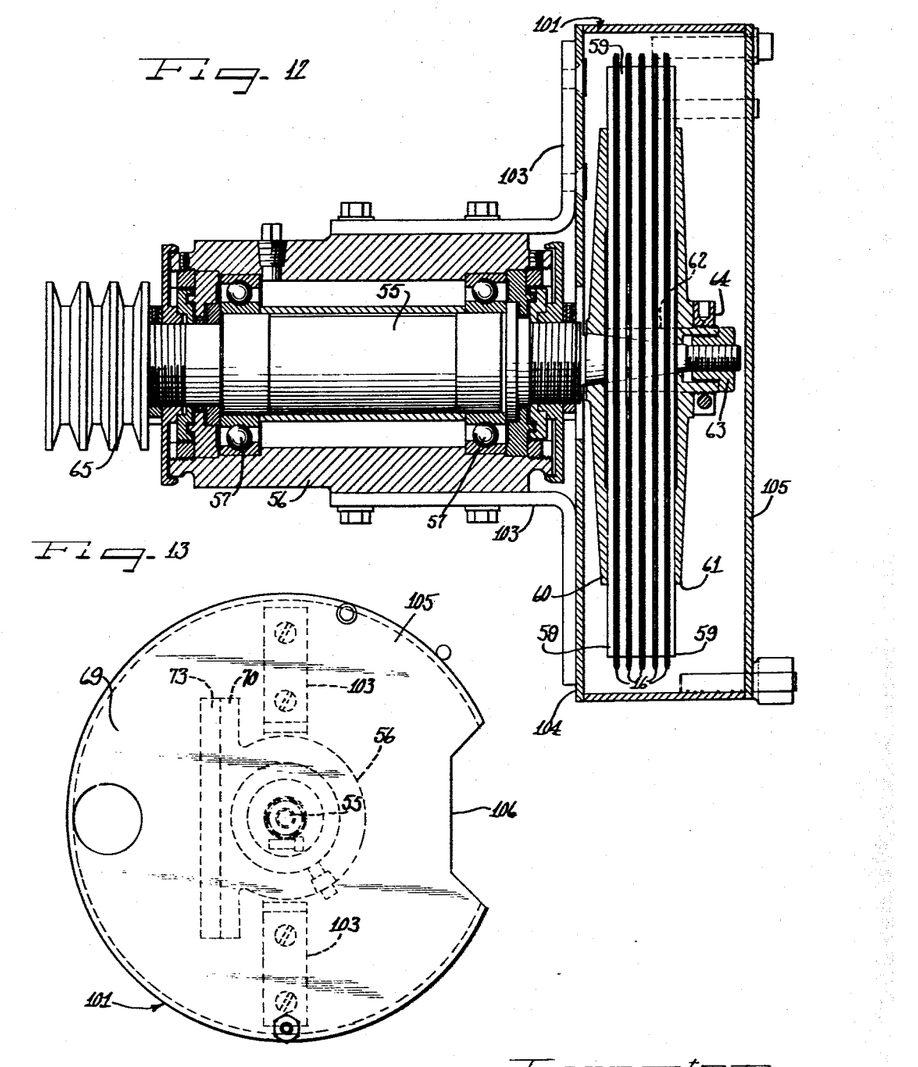
Figure 12 is a vertical sectional view taken through the spindle housing and spindle for the beveling wheels and showing the beveling wheels on the spindle.
Figure 13 is a view showing the guard for the beveling wheels and looking at the opposite side thereof from Figure 6.

The grinding wheels 16, 16 are shown in Figure 12 as being mounted on the tapered free end of a spindle 55 journaled in a spindle housing 56 on spaced anti-friction bearings 57, 57. The grinding wheels 16, 16 are shown as being spaced apart by spacing disks 59, 59 on the tapered end of the spindle 55, which space the wheels a sufficient distance apart to extend between the crowns of the adjacent runs of the spiral. A face plate or flange 60 abuts the inner disk 59 and has a hub 62 mounted on the spindle 55. The wheels 16, 16 and spacing disks 59, 59 are mounted on the hub 62 as shown. A face plate 61 abuts the outer disk 59 and is clamped to the face of said outer disk to secure said disks and grinding wheels to the hub 62 by means of a nut 64 threaded on the end of said hub 62 and engaging the face plate 61. A nut 63 threaded on the end of the spindle 55 engages an outwardly opening recess formed in the end of said hub and serves to secure said hub and the face plate 60 to the spindle 55. The opposite end of the spindle from the grinding wheels 16, 16 is shown as having a pulley 65 secured thereto, for driving said spindle from a motor 66 through V-belts 67, 67.

Figure 10:
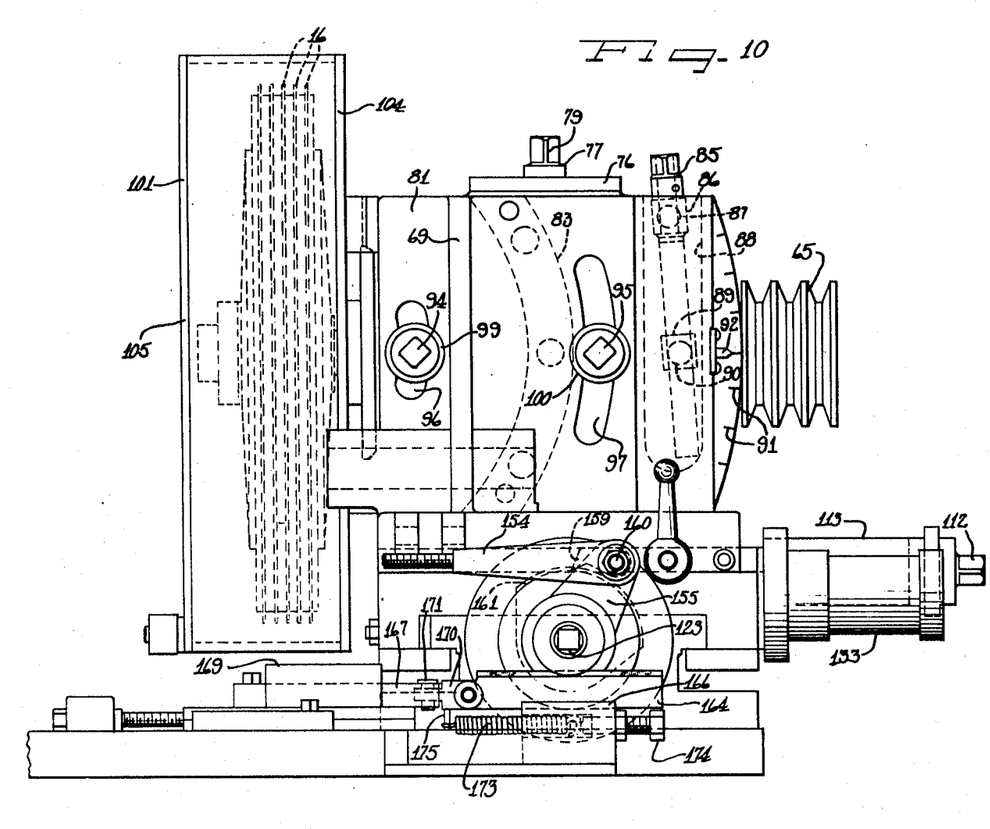
Figure 10 is an enlarged rear end view of the beveling mechanism.
Figure 11:
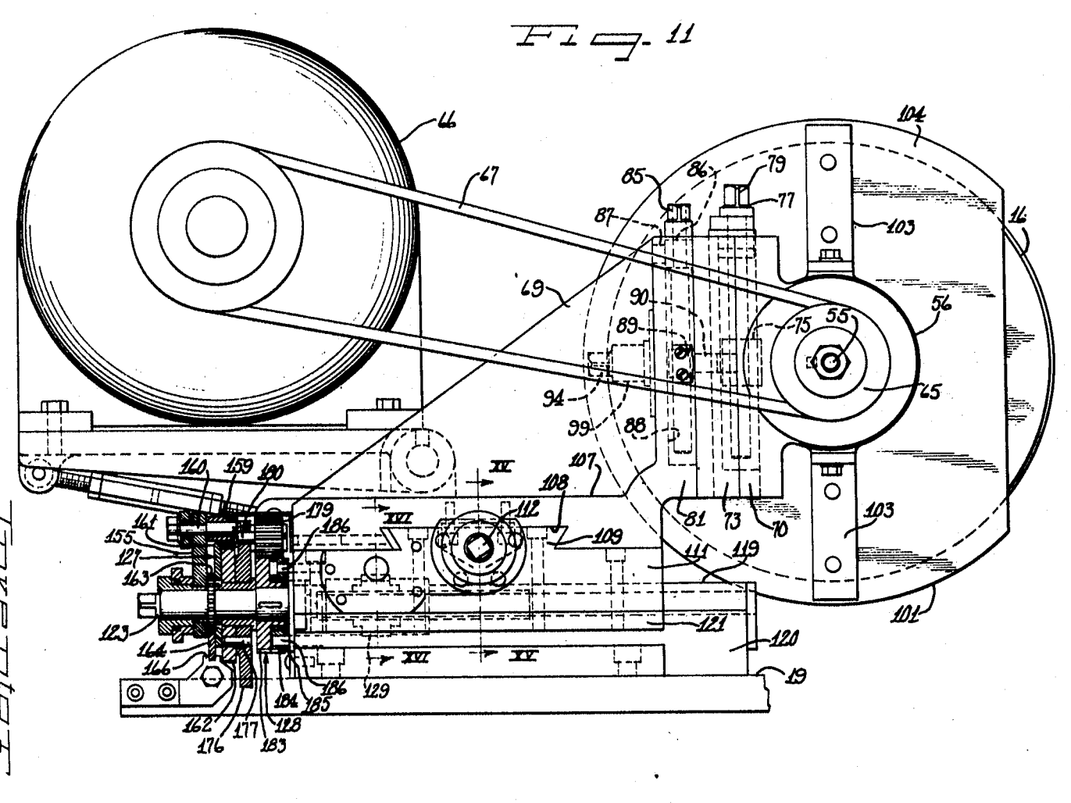
Figure 11 is a view in side elevation of the beveling mechanism showing the infeed gearing for the beveling wheels in vertical section.
Figure 14:
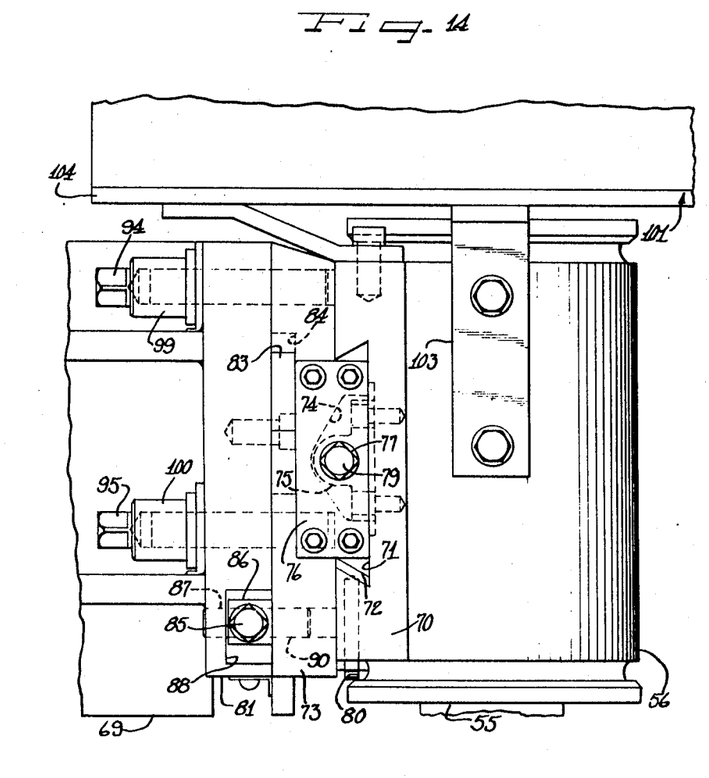
Figure 14 is an enlarged fragmentary plan view of the beveling spindle housing and support therefor, showing certain details of support not shown in Figures 5, 10 and 11.

The spindle housing 56 is shown in Figures 10, 11 and 14 as being supported on the outboard end of a bracket 69 for vertical adjustment with respect thereto, and also for tilting movement with respect thereto about an axis extending transversely of the axis of rotation of said spindle 55, and herein shown as intersecting the transverse center of the center grinding disk 16, although it need not be so located.

The spindle housing 56 is herein shown as having a vertically extending plate 70 at its rear end extending substantially the length thereof and upwardly and downwardly therefrom, and shown as being formed integrally therewith (see Figures 11 and 14). The plate 70 is shown as having a dove-tail groove 71 extending vertically therealong to slidably receive a corresponding dovetail tongue 72 extending forwardly from a vertically extending support plate 73. The vertically extending plate 73 is recessed vertically along the central portion of the dove-tail tongue 72 as indicated by reference character 74 to accommodate a feed nut 75 secured to the inner face of the groove 71 and extending therefrom. The top of recess 74 is covered by a cap 76, secured to the top face of the support plate 73 as by cap screws. A threaded rod 77 is rotatably mounted in the cap 75 and depends therefrom, and has threaded engagement with the nut 75.

The threaded rod 77 has a rectangular upper end portion 79 for an adjusting wrench or crank (not shown) for vertically adjusting the spindle head and spindle, and for holding the spindle head and spindle in the desired position of vertical adjustment in an obvious manner. A set screw 80 is shown as being provided to lock the spindle in position.

The plate 73 at its rear end abuts the vertical plane surface of a support plate 81 on the outer end of the outboard support bracket 69. The plate 81 has a vertically extending arcuate guide gib 83 on the forward face thereof, the arc of which is struck from the center of tilting movement of the spindle 55 and spindle head 56, herein shown as being the transverse center of the center grinding wheel 16. The arcuate guide gib 83 has slidable guiding engagement with an arcuate recess 84 formed in the rear face of the plate 73 and forming an arcuate guide for the spindle head 26 and the spindle head 55, guiding said spindle head and spindle for movement about a fixed axis spaced in advance of the edge of the plate 81.

The spindle 55 and spindle head 56 are tilted by means of a threaded rod 85. The rod 85 is shown in Figures 10, 11 and 14 as having a squared head to receive a crank or wrench, and as being rotatably mounted in a block 86 transversely pivoted to the plate 81 on a pivot pin 87. The threaded rod 85 extends downwardly along a vertical slot or recess 88 formed in the forward face of the plate 81, within which extends a nut or block 89 having threaded engagement with said rod. The threaded block 89 is shown as being pivotally mounted on the plate 73 on a pivot pin 90. Turning of the threaded rod 85 in one direction or another will thus move the plate 73 along the arcuate gib 83 and tilt the spindle 55 about a fixed axis in an obvious manner.

The plate 73 extends beyond one end of the plate 81 toward the pulleys 65 and is shown as having an arcuate edge conforming to the arc of movement of the spindle 55, and as having gauge marks 91 spaced therealong, cooperating with an indicator 92 on the edge of the plate 81, to indicate the angle of the spindle with respect to the plate 81 and thus indicate the angle of the bevel of the crowns of the ring (see Fig. 10).

Locking screws 94 and 95 rotatably secured to the plate 73 and extending through arcuate slots 96 and 97, respectively, formed in the plate 81, are provided to lock the spindle housing 56 and spindle 55 in the desired angular relation with respect to the plate 81 and the piston ring strip material. The locking screws 94 and 95 are rotatably mounted in the plate 73 in a suitable manner and extend rotatably through and have abutting engagement with collars 99 and 100, respectively. Said collars engage the rear face of the plate 81 to provide a relatively large clamping bearing area on opposite sides of the slots 96 and 97.

The grinding wheels 16, 16 are shown as being guarded by a generally cylindrical guard 101 secured at its inner wall to the spindle housing 56 by angle straps 103, 103 secured to the top and bottom of said spindle housing and projecting upwardly and downwardly therefrom. One end wall 104 of the guard 101 is shown as being cut away along a chord intersecting the arc of the cylindrical wall of said guard, to accommodate the grinding wheels 16, 16 to extend therebeyond and effect the grinding operation. An opposite end wall 104 is shown as having a recess 106 therein, to afford protection to the operator, but sufficiently large to accommodate the grinding wheels 16 to project therefrom into engagement within the crowns of the piston ring material.

The outboard support bracket 69 extends outwardly from and beyond one side of a base plate 107, having a dove-tail slot 108 formed in the bottom thereof and extending transversely thereof. The slot 108 is slidably engageable with a dove-tail tongue 109 projecting upwardly from a bed plate 111. A cross-feed screw 112 is provided to move the bracket 69 and spindle head 56 transversely of the bed plate 111 to position the grinding wheels 16, 16 in a central location with respect to the opposite crowns 10, 10 of the piston ring strip material and assure that the grinding wheels 16, 16 bevel each adjacent crown a like amount. The cross-feed screw 112 is shown as having a square head at its outer end and as being rotatably mounted in a support member 113 secured to and extending laterally from the bed plate 111. The screw 112 has a flange or shouldered portion 114 formed intermediate its ends abutting a washer 115 shown as abutting the inside of the support 113. A flanged collar 115ª is secured to the cross-feed screw 112 adjacent its outer end, as by a set screw 116. The flanged portion of the collar 115ª is shown as abutting a flanged collar 117 secured to the outer end of the support 113. The cross-feed screw 112 is threaded within a nut 118 depending from the bottom of the plate 107 in the center of the grooved portion thereof. Rotation of the screw 112 by means of a wrench or a handcrank will thus feed the bracket 69 and grinding wheels 16, 16 transversely of the bed plate 111 in an obvious manner.

Figure 15:
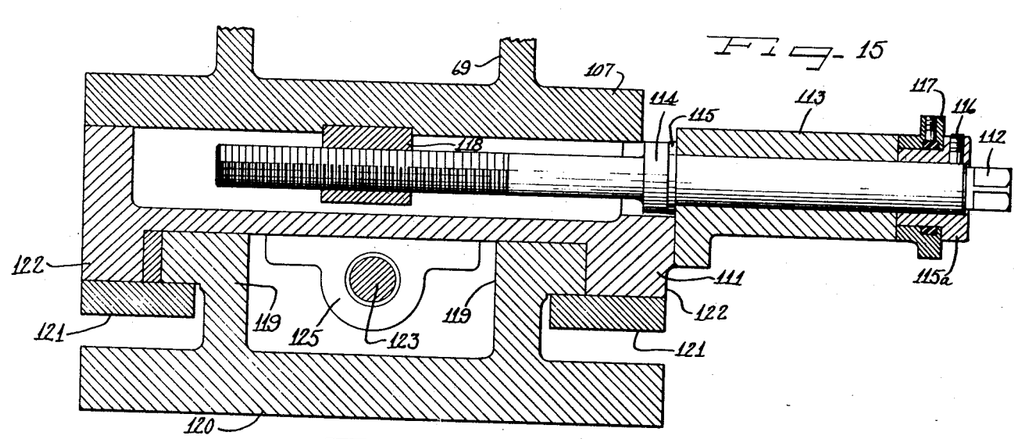
Figure 15 is a sectional view taken substantially along lines XV—XV of Figure 11.

The bed plate 111 is shown in Figure 15 as being supported on parallel spaced rails 119, 119 extending upwardly from and along a base plate 120 for the apparatus. The rails 119, 119 are shown as being flanged and as being slidably engaged by retaining gibs 121, 121 secured to the bottom of depending gibs 122, 122 of said bed plate and extending inwardly along the flanges of the rails 119, 119.

Figures 17, 18:
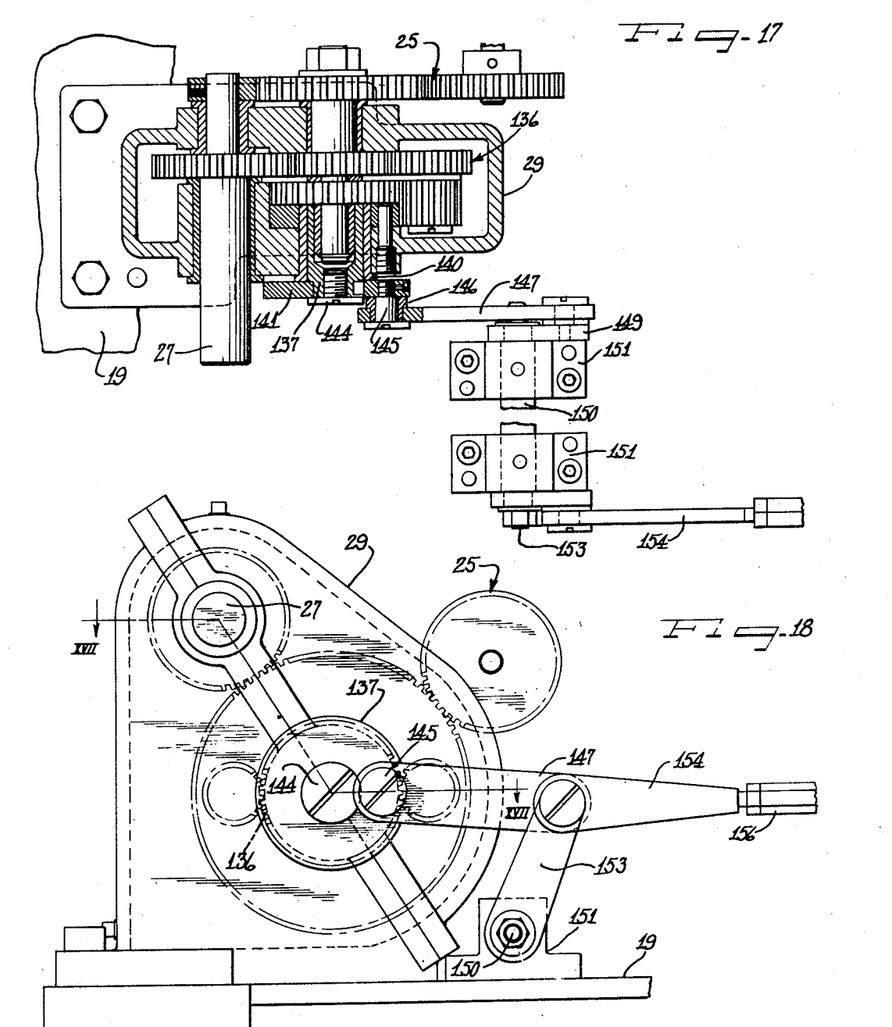
Figure 17 is a fragmentary horizontal sectional view illustrating certain details of the drive to the infeed mechanism for the beveling wheels.
Figure 18 is a view in side elevation of the housing for the gearing for driving the infeed mechanism, and showing certain details thereof not shown in Figure 17.
Figure 19:
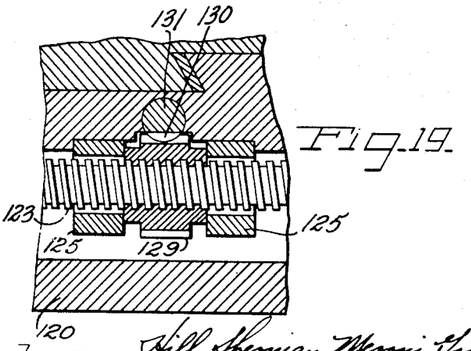
Figure 19 is an enlarged detail sectional view taken substantially along line XIX—XIX of Figure 16 and showing certain details of the feed mechanism for the bed plate of the machine.

The means for feeding the bed plate 111 along the rails 119, 119 and feeding the grinding wheels 16, 16 inwardly of the piston ring strip material may be of a well known form and is shown in Figures 11 and 17 as comprising a longitudinally extending feed screw 123 rotatably supported in the base plate 120 between the rails 119, 119 and extending therealong. The outer end of said feed screw is squared as indicated by reference character 124, to afford a means for adjusting the position of the bed plate 111 and wheels 16, 16 by hand, and initially moving said wheels in the spaces between the lands or crowns of the strip material.

The feed screw 123 is shown as being threaded through the threaded bore of a spur gear 129, forming a feed nut for feeding the bed plate 111 along the rails 119, 119. The spur gear 129 is abutted at its opposite ends and held from rectilinear movement with respect to the feed screw 123 by abutment members 125, 125 secured to the bottom of the bed plate 111 and depending therefrom and bored to accommodate the shaft 123 to pass therethrough. The spur gear 129 meshes with ratchet teeth 130 formed on the under surface of a rod 131 and is held from rotatable movement by said ratchet teeth when the rod 131 is stationary. The feed screw 123 is rotated by power under control of the gauge wheel 50, through a step-by-step ratchet mechanism 127 and planetary reduction gearing 128 driven thereby, as will be more clearly apparent as this specification proceeds.

Figure 16:
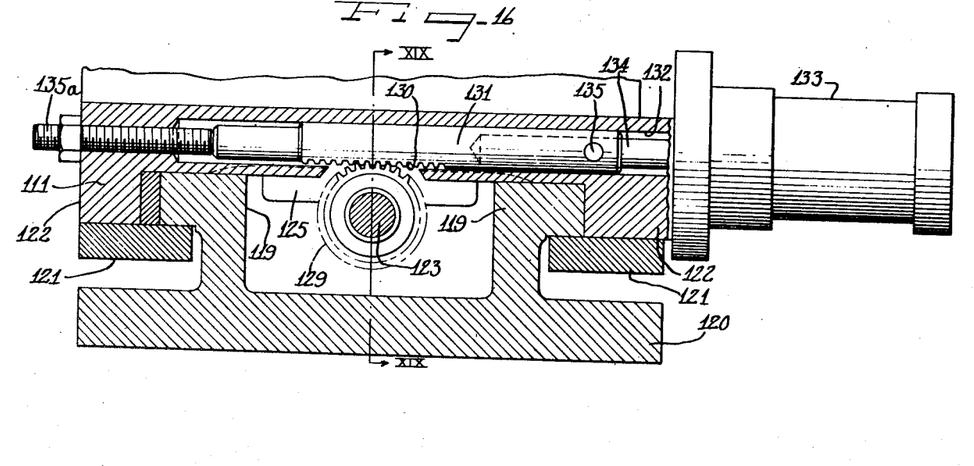
Figure 16 is a sectional view taken substantially along lines XVI—XVI of Figure 11.

The rod 131 is guided in the bed plate 111 for movement transversely thereof in a transverse guide 132 (see Fig. 16). The rod 131 is shown as being slidably moved along the guide 132 in the bed plate 111 by means of a cylinder and piston unit indicated generally by reference character 133. A piston rod 134 extensible from the cylinder 133 is shown as extending within and as being pinned to the rod 131 as by pin 135, for moving said rod along the guide 132 upon the admission of fluid under pressure to the piston rod end of said cylinder and piston unit 133. A threaded stop 135ª is shown as extending within the guide 132 from the opposite end of the bed plate 111 from the cylinder 133, for limiting extensible movement of the piston rod 134 from the cylinder 133 to limit retracting movement of the grinding wheels 16, 16. The purpose of the cylinder and piston unit 133 and the rack 131 and threaded spur gear 129 driven thereby is to rotate the spur gear 129 and immediately retract the grinding wheels 16, 16 when rotation of the arbor stops, to eliminate the grinding of flats on the crowns of the rings. The admission of fluid under pressure to the piston rod end of the cylinder and piston unit 133 may be controlled by solenoid operated valve means (not shown) suitably connected to be operable to supply fluid under pressure to said cylinder and piston unit, whenever the motor 24 stops.

While I have herein shown a cylinder-piston unit for retracting the grinding wheels 16, 16 when rotation of the arbor 21 stops, it is obvious that a solenoid or any other operating means desired may be used to retract said grinding wheels.

Referring now to the infeeding mechanism for rotating the feed screw 123 by power and feeding the grinding wheels 16, 16 inwardly with respect to the lands of piston ring strip material as said grinding wheels wear, to assure a uniformly thinned strip, the pawl and ratchet device 127 serves to drive the planetary reduction device 128 which, in turn, drives the feed screw 123 at an infinitesimally low rate of speed. The pawl and ratchet device 127 is driven from the motor 24 by means of the shaft 27 journaled in the gear casing 29. (See Figures 17 and 18.)

The shaft 27 drives a spur gear reduction train 136 journaled within the casing 29. The gear train 136 rotatably drives a sleeve 137 journaled within said casing on a bearing 140 and extending outwardly from said bearing and casing. A disk 141 is shown as being secured to the outer end of the sleeve 137 and as being keyed or otherwise secured thereto. A screw 144 threaded in the outer end of the sleeve 137 serves to rotate the spur gear 129 and retain the disk 141 to the sleeve 137. The disk 141 has a pin 145 extending outwardly therefrom, eccentric of the center thereof. The pin 145 is herein shown as being a headed pin threaded within the disk 141 and suitably locked thereto, and as having a shouldered bearing 146 thereon, having one end of a link 147 rotatably mounted thereon. The link 147 is pivotally connected at its end opposite the pin 145 to a crank 149 on one end of a longitudinal shaft 150 (see Fig. 17). The shaft 150 is shown as being journaled on the table 19 on spaced bearing support members 151, 151 and as having a crank 153 secured to its rear end and extending upwardly therefrom. The crank 153 is pivotally connected to one end of a link 154, which is connected at its opposite end to a crank 155 journaled on the feed screw 123 for rocking movement with respect thereto. A turnbuckle 156 is shown as being provided in the link 154, to adjust the length thereof when required.

The crank 155 serves as the drive member for the pawl and ratchet device 127 and has a pawl 159 pivotally mounted thereon on a pivot pin 160 (see Figs. 10 and 11). The pawl 159 may be of any well known form and is shown as being slidable along the outer face of a ratchet shield 161, mounted coaxial with the feed screw 123, for pivotal movement with respect thereto. The shield 161 is shown as being shaped in the form of a segment of a cylinder, with the rim thereof extending over the teeth of a ratchet wheel 162. The shield 161 is pivoted to permit the pawl 159 to engage the teeth of the ratchet wheel 162 by means of a gear 163 secured to said shield coaxial with the feed screw 124 and rotatably movable with respect thereto.

The gear 163 is shown as meshing with the teeth of a rack 164 and as being rotatably moved thereby upon rectilinear movement of said rack in a direction transversely of the feed screw 123. The rack 164 is shown as being slidably guided in an upwardly facing guide 166 mounted on and extending upwardly from the base 19. The rack 164 is herein shown as being operated by an armature 167 of a solenoid 169, although it need not be so operated and may be operated by a fluid motor or by any other suitable operating means. A clevis 170 transversely pivoted to the end of the rack 164 connects said rack with the plunger 167 by a vertical pivotal pin 171. A spring 173 connected at one of its ends to an adjusting screw 174 and at its opposite end to a pin 175 depending from the clevis 170, is provided to retract said rack and move the shield 161 in position to prevent the pawl from coming into engagement with the teeth of the ratchet wheel 162. The tension of the spring 173 may be adjusted by the screw 174.

The ratchet wheel 162 is pinned to a disk or cage 176 of a planetary gear reduction device 128 as by a pin 177. The disk 176 is shown as having a pinion 179 rotatably carried thereby on a pin 180 and forming a planetary pinion for the planetary reduction device 128. The planetary pinion 179 is shown as meshing with two spur gears 183 and 184. The spur gear 183 is shown as being keyed to the feed screw 123 for rotatably driving the same, whereas the spur gear 184 is shown as being journaled on the hub of the spur gear 183 and as being secured to and end plate 185 for the bed plate 111 on pins 186, 186. The spur gear 184 thus forms the reaction means for the planetary pinion 179, causing said pinion to walk thereabout and at the same time drive the spur gear 183 at a slow feeding speed.

Referring now to the means for controlling the energization of the solenoid 169 by the gauge wheel 50, as previously mentioned, the face of the gauge wheel 50 is beveled to correspond to the chamfer of the crowns and said gauge wheel is mounted on one arm 51 of the bell crank 52 (see Fig. 9). Another arm 187 of the bell crank 52 extends upwardly from its pivotal axis and serves to operate a limit switch 188, as will now be described.

The limit switch 188 is shown as being mounted on the top of a bracket 190 extending upwardly from the nut 44. The arm 187 is shown as having a pin 191 mounted in its upper end portion and extending therefrom into interengagement with one edge of an operating lever 197 for the limit switch 188. The operating lever 197 is slidably guided in a bracket 199 projecting upwardly from the nut 44 on the opposite side of the bell crank 52 from the bracket 190 and is engaged at its face opposite the pin 191 by a fulcrum pin 200 having interengagement with a V-shaped notch formed in said lever. A tension spring 201 serves to maintain the lever 197 in engagement with the fulcrum pin 200, and to release the operating lever 197 from the limit switch 191. A threaded stop 192, threaded through the bracket 190, engages the arm 187 of the bell crank 52 to limit downward movement of the gauge wheel 50.

As the chamfer is ground deeper in the insides of the crowns, the gauge wheel 50 will move downwardly into the chamfer, backing the pin 191 from the lever 197 and accommodating the spring 201 to move the operating lever 197 away from the limit switch and allow the same to open. The solenoid 169 will then be deenergized and the spring 173 will move the shield 161 into position to hold the pawl 159 out of engagement with the rack 162. Infeed of the wheels 16, 16 will then stop.

Where the chamfer is not deep enough, the gauge wheel 50 will raise along the spiral strip piston ring material and pivot the arm 197 to operate the limit switch and close a circuit to energize the solenoid 169. Upon energization of the solenoid 169 the rack 164 will move against the tension spring 173. This will rotate the gear 163 and shield 161, and accommodate the pawl 159 to slide off the end of the shield and engage the teeth of the ratchet wheel 162. Reciprocable movement of said pawl will accordingly turn said ratchet wheel during the feeding stroke of said pawl and drive the planetary geared reduction device 128 to rotate the feed screw 123 an infinitesimal amount during each feeding stroke of said ratchet, and slowly feed the grinding wheels 16, 16 into the piston ring strip material.

It should here be understood that the pawl 159 is continuously reciprocating during rotation of the arbor 121 and only drives the planetary gearing when the shield 161 is in position to allow the pawl to drop off the end thereof. The pawl and ratchet drive device and planetary gearing thus affords an infinitesimally slow feeding speed for the grinding wheels 16, 16, feeding said wheels to compensate for wear thereof, to assure uniform beveling of the legs or crown segments of the strip material for the entire length thereof.

It will be understood that modifications and variations may be effected without departing from the scope of the novel concepts of the present invention.

I claim as my invention:

1. A method of continuously beveling the insides of the crowns of continuous strip piston ring material having a web and connected parallel spaced slit crowns extending from opposite sides thereof, comprising the confining of the strip material to a rotating arbor and feeding the material therealong in a helical path and at the same time beveling the insides of the crowns with a grinding action at an acute angle to the axis of the helix of the strip.

2. A method of continuously beveling the insides of the spaced crowns of continuous strip piston ring material having a web and connected parallel spaced slit crowns extending from opposite sides thereof, comprising the confining of the strip material to a helical form of the diameter it will assume in the piston and cylinder of an engine, rotating the helical material and advancing it along the axis thereof and simultaneously beveling the insides of opposite crowns of the strip material with a single grinding action directed at an acute angle with respect to the axis of the helix.

3. A method of thinning the lands of continuous strip oil piston ring material having a web and connected parallel spaced slit crowns extending from opposite sides thereof, comprising the confining of the web of the piston ring material to its inner diameter when in the piston and cylinder of an engine with the crowns extending outwardly therefrom, feeding the strip material so confined in a helical path and during feeding of the confined material beveling the adjacent crowns of the strip material from the insides thereof with a rotatable grinding action directed at an obtuse angle to the face of one land and at an acute angle to the face of the next adjacent land.

4. A method of continuously thinning the lands of continuous strip piston ring material having a web and connected parallel spaced slit crowns extending from opposite sides thereof, the steps of confining the web of the strip material to substantially the diameter it will assume when in the piston and cylinder of an engine in the form of a closely coiled helix, feeding the material so confined in a helical path and during feeding movement of the confined material beveling the insides of adjacent crowns of the strip material with a single rotatable grinding action between adjacent crowns and directed at an angle with respect to the axis of the helix.

5. A continuous method for thinning the lands of continuous strip oil piston ring material having a web and connected parallel spaced slit crowns extending from opposite sides thereof, the steps of confining the strip material to substantially cylinder bore size in the form of a closely coiled helix, maintaining the helix closely coiled, and feeding the coiled material so confined in a helical path and during feeding movement thereof simultaneously beveling the insides of adjacent crowns of a plurality of runs of the strip material with a rotatable grinding action within adjacent crowns at a plurality of places along the spiral and directed at an acute angle to the longitudinal axis of the helix.

6. A method of finishing continuous strip piston ring material channel-like in cross section and having a web and connected parallel spaced slit crowns having cylinder contacting lands on the edges thereof and simultaneously thinning the lands thereof, comprising the steps of confining the strip material in the form of a helix of substantially cylinder bore diameter and feeding the material so confined in a helical path and during feeding movement of the confined material finishing the strip material to cylinder bore size on one side of the helix and beveling the insides of the crowns of the strip material on the opposite sides of the helix with a rotatable grinding action directed on an acute angle to the longitudinal axis of the helix and extending within the space between adjacent crowns.

7. A method of simultaneously thinning the crowns of channel like piston ring material having a web and connected parallel spaced slit crowns comprising the steps of confining the material to the form of a tight helix with the crowns extending outwardly from the web thereof and feeding the material along its axis in a helix path, inserting a thin grinding wheel in the space between adjacent crowns and inclining the grinding wheel relative to the axis of the helix to engage the adjacent inner faces of the crowns with a single wheel, and rotating the wheel to continuously bevel the crowns.

8. In an apparatus for thinning the lands of continuous strip piston ring material having a web and connected parallel spaced slit crowns extending from opposite sides thereof, a rotatable arbor, means for confining the strip material on said arbor in the form of a close helix of substantially cylinder bore diameter comprising a feed nut at the discharge end of said arbor, said feed nut having a grinding wheel receiving opening extending along one side thereof, and a thin grinding wheel positionable to extend through said opening within the space between adjacent crowns of the strip material, a motor for driving said grinding wheel, and means for inclining the axis of said grinding wheel with respect to the axis of said arbor and for positioning said wheel to simultaneously bevel the insides of adjacent crowns of the strip material.

9. In an apparatus for thinning the lands of continuous strip piston ring material channel-like in cross section and having a web and parallel spaced crowns extending therefrom having cylinder contacting lands on the edges thereof, means for confining the material to a tight helix and for feeding the material in a helical path comprising an arbor, means for rotatably driving said arbor, a feed nut at the discharge end of said arbor having a grinding wheel-receiving opening extending along one side thereof, a spindle associated with said feeding and confining means and mounted for movement toward and from the strip material and transversely thereof and for inclination with respect to the axis of the helix, a thin grinding wheel on said spindle of a width less than the space between adjacent crowns of the strip material and movable into said opening in said feed nut into the space between adjacent crowns of the strip, means for inclining the axis of said spindle with respect to the longitudinal axis of the helix, means for rotatably driving said spindle and grinding wheel while so inclined for beveling the insides of adjacent crowns of the strip, and other means for feeding said grinding wheel inwardly toward the strip material to compensate for wear of the wheel.

10. An apparatus for thinning the lands of continuous strip piston ring material having a web and connected parallel spaced slit crowns extending from opposite sides thereof comprising means for confining the strip material to a close helix with the crowns extending outwardly from the web thereof and feeding the material so confined in a helical path, a spindle associated with said confining and for feeding means, the axis of said spindle in the same general direction as the axis of said helix, means for inclining the axis of said spindle with respect to the axis of said helix, a motor for rotatably driving said spindle, a thin grinding wheel on said spindle of a width less than the space between adjacent crowns of the strip, means for feeding said spindle and grinding wheel in the direction of the axis of the strip to center the wheel with respect to the space between the crowns of the strip, other means for feeding the spindle and grinding wheel toward and from the strip and for positioning said grinding wheel between adjacent crowns of the strip, and a step-by-step feeding mechanism controlled by the thinness of the thinned lands of the strip for advancing said spindle and grinding wheel toward the crowns of the strip during the grinding operation as said grinding wheel wears.

11. An apparatus for thinning the lands of continuous strip piston ring material having a web and connected parallel spaced slit crowns extending from opposite sides thereof comprising means confining the strip material to a close helix with the crowns extending outwardly from the web thereof and for feeding the material so confined in a helical path, a spindle associated with said confining and feeding means, the axis of said spindle extending in the same general direction as the axis of said helix, a motor for rotatably driving said spindle, a thin grinding wheel on said spindle adapted to fit within the space between adjacent crowns of the strip, means for feeding said spindle and grinding wheel in the direction of the axis of the strip to center the wheel with respect to the space between the crowns of the strip, other means for feeding the spindle and grinding wheel toward and from the strip and for positioning said grinding wheel between adjacent crowns of the strip, and a step-by-step feeding mechanism controlled by the thinness of the thinned lands of the strip for advancing said spindle and grinding wheel toward the crowns of the strip during the grinding operation as said grinding wheel wears, said feeding mechanism comprising a ratchet, a reciprocating pawl, means for reciprocably driving said pawl, and a shield extending over said ratchet and movable in accordance with the thinness of the lands of the strip piston ring material for moving the shield to accommodate said pawl to engage said ratchet.

12. An apparatus for thinning the lands of continuous strip piston ring material having a web and connected parallel spaced slit crowns extending from opposite sides thereof comprising means for confining the strip material to a close helix with the crowns extending outwardly from the web thereof and for feeding the material so confined in a helical path, a spindle associated with said confining and feeding means, the axis of said spindle extending in the same general direction as the axis of said helix, a motor for rotatably driving said spindle, a thin grinding wheel on said spindle, means for feeding said spindle and grinding wheel in the direction of the axis of the strip to center the wheel with respect to the space between the crowns of the strip, other means feeding the spindle and grinding wheel toward and from the strip and positioning said grinding wheel between adjacent crowns of the strip, and a step-by-step feeding mechanism controlled by the thinness of the thinned lands of the strip for advancing said spindle and grinding wheel toward the crowns of the strip during the grinding operation as said grinding wheel wears, said feeding mechanism comprising a ratchet, a reciprocably movable pawl, means for reciprocally driving said pawl, a shield extending over said ratchet, and operating means for said shield comprising a gauge wheel riding between the thinned crowns of the strip piston ring material, and operating mechanism for moving said shield into position to accommodate said pawl to engage said ratchet wheel and controlled by the depth said gauge wheel rides into the space between said crowns.

13. An apparatus for thinning the lands of continuous strip piston ring material having a web and connected parallel spaced slit crowns extending from opposite sides thereof comprising means for confining the strip material to a close helix with the crowns extending outwardly from the web thereof and for feeding the material so confined in a helical path, a spindle associated with said confining and feeding means, the axis of said spindle extending in the same general direction as the axis of said helix, a motor for rotatably driving said spindle, a thin grinding wheel on said spindle, means for feeding said spindle and grinding wheel in the direction of the axis of the helically confined strip to center the wheel with respect to the space between the crowns of the strip, other means for feeding the spindle and grinding wheel toward and from the strip and for positioning said grinding wheel between adjacent crowns of the strip, and a step-by-step feeding mechanism controlled by the thinness of the thinned lands of the strip for advancing said spindle and grinding wheel toward the crowns of the strip during the grinding operation as said grinding wheel wears, said feeding mechanism comprising a ratchet, a reciprocably movable pawl, means for reciprocably driving said pawl, a shield extending over said ratchet, and operating means for said shield comprising a gauge wheel of a contour generally conforming to the form of the insides of adjacent crowns of the strip material and riding therebetween, a solenoid energizable to move said shield into position to accommodate said pawl to engage said ratchet, and a limit switch operated by said gauge wheel upon upward movement with respect to the strip for energizing said solenoid.

14. In an apparatus for thinning the lands of continuous strip piston ring material having a web and parallel spaced slit crowns extending from opposite sides thereof, a rotatable arbor, a motor for driving said arbor, a feed nut encircling said arbor at each end thereof for guiding the strip piston ring material onto said arbor in the form of a tight helix and for retaining it in such form during travel therealong, a spindle extending along one side of said arbor in the same general direction as the axis of said arbor, means for rotatably driving said spindle, a thin grinding wheel on said spindle of a width to fit within the space between adjacent crowns of the strip material, means for feeding said spindle toward and away from said arbor to position said grinding wheel in the space between adjacent crowns of the strip material, other means for feeding said spindle axially of said arbor to align said grinding wheel in alignment with the space between adjacent crowns of the strip and within the space therebetween, and a gauge wheel mounted on said arbor for engagement with the finished strip between adjacent crowns thereof and operatively connected with said means for feeding said spindle toward the strip, to control inward feeding movement of said spindle and grinding wheel in accordance with the thinness of the lands of the crowns.

15. In an apparatus for thinning the lands of continuous strip piston ring material comprising a web having parallel spaced crowns extending therefrom, a rotatable arbor, a motor driving said arbor, a feed nut encircling each end of said arbor and internally threaded to progress the piston ring material onto said arbor and retain the material thereon in the form of a tight helix, the improvements comprising a spindle rotatable about an axis extending in the general direction of the axis of said arbor, a thin grinding wheel on said spindle, means for tilting said spindle with respect to the axis of said arbor to incline opposite faces of said grinding wheel with respect to the insides of the crowns of the strip for beveling the same upon rotation of said wheel, a feed screw operable to feed said grinding wheel toward and from said arbor, gear reduction means for operating said feed screw, and a gauge wheel riding between the adjacent finished thinned crowns of the strip on said arbor and for controlling operation of said gear reduction means in accordance with the bevel of the crowns of the strip.

16. In an apparatus for thinning the lands of continuous strip piston ring material comprising a web having parallel spaced crowns extending therefrom, a rotatable arbor, a motor driving said arbor, a feed nut encircling each end of said arbor and internally threaded to progress the piston ring material onto said arbor and retain the material thereon in the form of a tight helix, the improvements comprising a spindle rotatable about an axis extending in the general direction of the axis of said arbor, a thin grinding wheel on said spindle, means for tilting said spindle with respect to the axis of said arbor to incline opposite faces of said grinding wheel with respect to the insides of the crowns of the strip for beveling the same upon rotation of said wheel, means for rotatably driving said grinding wheel, a feed screw operable to feed said grinding wheel toward and from said arbor, gear reduction means for operating said feed screw, a gauge wheel riding between the adjacent finished thinned crowns of the strip on said arbor and controlling operation of said gear reduction means in accordance with the bevel of the crowns of the strip, and a quick return means operatively connected with said feed screw and operated upon the stopping of rotation of said arbor for rotating said feed screw and withdrawing said grinding wheel from the strip on said arbor.

17. In an apparatus for beveling the insides of the crowns of ladder-like U-shaped strip oil piston ring material, a rotatable arbor, a motor rotatably driving said arbor, means for progressing the strip material onto and along said arbor in the form of a tight spiral including a gear at the entering end of said arbor meshing with the cross-bars of the strip material and feed nuts encircling said arbor at each end thereof, other means extending along said arbor for rotating the strip material with said arbor and maintaining the strip material in tight engagement with said arbor, a spindle extending in the general direction of the axis of said arbor, a motor for rotatably driving said spindle, a thin grinding wheel on said spindle, means inclining the axis of said spindle about an axis transverse to the axis of said arbor and positioning said grinding wheel to engage the insides of the adjacent crowns of the strip at opposite acute angles, a feed screw operatively connected with said spindle for advancing the same toward said arbor, a step-by-step drive mechanism, means driven by said first motor for driving said step by step drive mechanism for operating said feed screw, and means for controlling operation of said step-by-step feed mechanism in accordance with the bevel of the crowns of the strip comprising a gauge wheel mounted on the feed nut at the discharge end of said arbor for engagement between adjacent finished crowns of the strip by gravity and riding therealong, and mechanism operated by said gauge wheel for effecting operation of said step-by-step feed mechanism in accordance with the bevel of the crowns of the finished strip.

18. In an apparatus for beveling the insides of the crowns of U-shaped piston ring material, a rotatable arbor, a motor for rotatably driving said arbor, means for progressing the material onto said arbor in the form of a tight coil and for feeding said material therealong including a nut encircling said arbor at the discharge side thereof and having an opening in one side thereof open to the strip material coiled on said arbor, a spindle rotatable about an axis extending in the general direction of the axis of rotation of said arbor, a thin grinding wheel on said spindle, said grinding wheel being positionable to extend within said opening in said nut in the space between adjacent crowns of the strip, means for inclining the axis of said spindle about an axis transverse to the axis of rotation of said arbor to angularly engage said grinding wheel with the insides of adjacent crowns of the strip at opposite angles to bevel the same, means for rotatably driving said spindle, a feed screw for feeding said grinding wheel toward and from said arbor, and means for rotating said feed screw in accordance with the bevel of the crowns of the strip and for feeding said spindle and grinding wheel inwardly towards the strip in accordance with the wear of said grinding wheel.

19. In an apparatus for beveling the insides of the crowns of U-shaped piston ring material, a rotatable arbor, a motor for rotatably driving said arbor, means for progressing the material onto said arbor in the form of a tight coil and for feeding said material therealong including a nut encircling said arbor at the discharge side thereof and having an opening in one side thereof open to the strip material coiled on said arbor, a spindle rotatable about an axis extending in the general direction of the axis of rotation of said arbor, a thin grinding wheel on said spindle, said grinding wheel being positionable to extend within said opening in said nut in the space between adjacent crowns of the strip, means inclining the axis of said spindle about an axis transverse to the axis of rotation of said arbor to angularly engage said grinding wheel with the insides of adjacent crowns of the strip at opposite angles to bevel the same, means for rotatably driving said spindle, a feed screw for feeding said grinding wheel toward and from said arbor, and means for rotating said feed screw in accordance with the bevel of the crowns of the strip and feeding said spindle and grinding wheel inwardly towards the strip in accordance with the wear of said grinding wheel, comprising a pawl and ratchet mechanism and reduction gearing driven thereby and operatively connected with said feed screw, a shield for controlling the engagement of said pawl with said ratchet, a gauge wheel mounted on said nut for engagement with the insides of adjacent finished crowns of the strip by gravity, and riding therealong, and means operated by said gauge wheel for operatively positioning said shield to actuate said pawl and ratchet device or render the same inactive.

20. The method of simultaneously beveling the opposed legs of channeled strip material which comprises winding the strip in helical form to provide a plurality of turns, inserting a separate grinding wheel into the channel of each of a plurality of adjacent turns of the wound strip, inclining the wheels relative to the turns to engage opposite faces of each wheel with the outer portions of the legs of the strip, rotating the wheels, and advancing the helix to progressively grind the legs with successive wheels.

21. In an apparatus for thinning the parallel lands of continuous strip piston ring material, a rotatable arbor, means for confining the material to a tight helix on said arbor and for feeding the material in a spiral path therealong, means for rotatably driving said arbor, a spindle associated with said arbor and mounted for movement toward and from said arbor and for inclination with respect to the axis of the spiral, a thin grinding wheel on said spindle movable into the space between adjacent lands of the strip, means for rotatably driving said spindle and grinding wheel for beveling the insides of adjacent lands of the strip at opposite angles, means for feeding said spindle and grinding wheel toward said arbor, and means controlled by the thinness of the lands of the finished strip for controlling operation of said feeding means comprising a gauge wheel mounted adjacent the discharge end of said arbor for engagement between adjacent finished lands of the strip by gravity, and riding therealong, and mechanism operated by said gauge wheel for effecting operation of said step by step feed mechanism in accordance with the bevel of the lands of the finished strip.

References Cited in the file of this patent

UNITED STATES PATENTS

| | | |
|---|---|---|
| 1,528,188 | Frost | Mar. 3, 1925 |
| 1,647,131 | Heim | Nov. 1, 1927 |
| 1,997,862 | Halborg et al. | Apr. 16, 1935 |
| 2,301,058 | Lehman | Nov. 3, 1942 |
| 2,552,284 | Klomp | May 8, 1951 |